United States Patent [19]

Martin

[11] 3,767,216
[45] Oct. 23, 1973

[54] DEFORMABLE SEALING RING
[75] Inventor: Georges Lucien Henri Martin, Paris, France
[73] Assignee: Societe De Precision General (Societe Anonyme), Montreuil Sous Bois, France
[22] Filed: Aug. 6, 1970
[21] Appl. No.: 25,610

Related U.S. Application Data
[62] Division of Ser. No. 719,935, April 9, 1968, Pat. No. 3,537,733.

[30] Foreign Application Priority Data
Apr. 13, 1967   France .............................. 67102549

[52] U.S. Cl. ................... 277/213, 151/38, 277/236, 285/340
[51] Int. Cl. ............................................. F16j 15/06
[58] Field of Search ................. 285/DIG. 18, 332.2, 285/340, 332.3; 151/38; 277/236, 235, 213, 35, 41, 81, 110, 169

[56] References Cited
UNITED STATES PATENTS
1,320,259   10/1919   Martens .............................. 151/38
1,983,522   12/1934   Coultas ................................. 277/35
2,879,093   3/1959    Dolhun ................................. 277/41
1,721,326   7/1929    Wilson ................................. 277/236
2,452,469   10/1948   Johnson ............................... 277/236

FOREIGN PATENTS OR APPLICATIONS
911,596    11/1962   Great Britain ................... 277/206.1
1,223,640   8/1966    Germany .......................... 277/81 R Primary Examiner—George E. Lowrance
Assistant Examiner—Robert I. Smith
Attorney—Edwin E. Greigg

[57] ABSTRACT

A pipe connection comprising two end-pieces the co-operating male and female surfaces of which include a central frusto-conical surface and two terminal radial surfaces. A deformable frusto-conical packing fitted and compressed between the two frusto-conical surfaces is bounded by inner and outer surfaces having an inflexion point in their middle so that the successive inwardly and outwardly convex sections engage the cooperating frusto-conical surfaces and the packing edges are extruded between the suitably shaped corresponding ends of the two frusto-conical surfaces.

4 Claims, 5 Drawing Figures

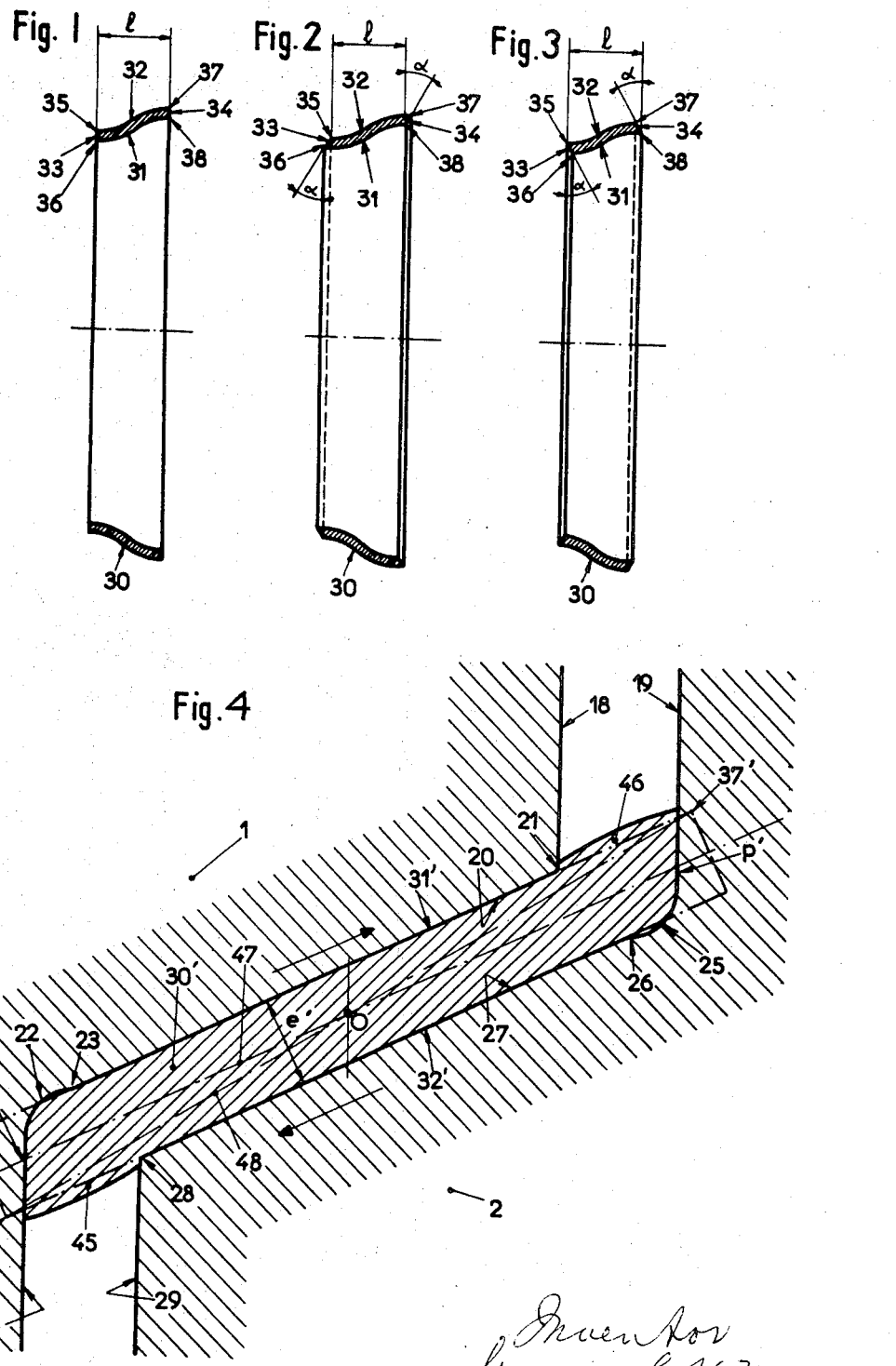

DEFORMABLE SEALING RING

This is a divisional application of Ser. No. 719,935, filed Apr. 9, 1968, now U.S. Pat. No. 3,537,733, issued Nov. 3, 1970.

Fluid-tightness of connections under extreme conditions of vacuum, pressure, high and low temperatures and vibrations is ensured by an extrusion of metal packings.

An old connection of the above type includes two end-pieces, the surfaces of which registering with each other are frusto-conical surfaces, that is, surfaces sloping with reference to the axis of the connection and which do not extend throughout the radial thickness of the end-pieces, while they are connected by rounded surfaces with bearing surfaces parallel with the axis of the connection, so that said frusto-conical surfaces form with the corresponding bearing surfaces two shoulders at an acute angle, engaged by a frusto-conical metal packing of a reduced thickness and of a rectangular cross-section, the length of said packing being larger than the length of the frusto-conical surfaces, so that the axial tightening of the end-pieces produces a compression and an extrusion of the packing Such packings ensure an excellent fluid-tightness but they show in particular the following drawbacks:

a. a defective securing of the packing on the end-pieces or flanges for all positions of the latter;

b. a prohibitive outer diameter of the actual packing, which leads to an exaggerated bulk of the connections;

c. an imperfect fluid-tightness against pressure and vacuum during the tightening of the end-pieces or flanges;

d. absence of a coaxial self-alignment of the arrangemnt when fitted with a radial clearance reduced to zero;

e. a lack of elastic memory of the packing when the connections or flanges are dismantled, whereby such a dismantling becomes difficult, as also the removal of said packing.

The general object of the present invention consists in providing a connection for coupling pipes showing improved properties as concerns assembly, bulk and fluid-tightness The particular object of the invention consists in producing a connection wherein the packing and the coupling end-pieces are sized with reference to each other in a manner such that after the two end-pieces have been brought together through the agency of a tightening member, the packing is, in succession, first urged into bending beyond the limit of elasticity and compressed between the surfaces of the end-pieces facing each other;

On the other hand, wedged between the conical surfaces of the end-pieces facing each other; and said lastly engaged by the sharp angle formed on sad end-pieces.

These three actions on the packing produce a perfect fluid-tight sealing of the packing between its end-pieces, whereby an improved sealing of the connection can be ensured in conveying means, said connection being capable of resisting both high and very low internal pressures, as well as high and low temperatures and also vibrations and flexional stresses.

In order to obtain the above -mentioned results, the connection according to the invention includes in combination:

two end-pieces facing each other and showing on their sides registering with each other, parallel frusto-conical surfaces which do not extend throughout the radial thickness of the end-pieces and are connected at their ends with annular substantially radial surfaces, said surfaces facing each other and merging into the frusto-conical surfaces being obtained through the agency of sharp ridges followed by rounded surfaces and further sharp ridges while a metal packing showing a double curvature is adapted to be fitted through its ends inside said rounded portions of the end-pieces on the one hand and engages at an intermediate point of its length, the frusto-conical surface facing each rounded portion considered on the other hand, means being provided for urging the two end-pieces axially towards each other.

Further features and advantages of the invention will appear in the reading of the following description, reference being made to the accompanying drawings illustrating various embodiments disclosed by way of example and no means in a limiting sense. In said drawings:

FIG. 1 is a diametrical cross-section of a packing;

FIG. 2 is a diametrical cross-section of a modification of the packing forming part of the connection;

FIG. 3 is a diametrical cross-section of a further modification of the packing forming part of the connection;

FIG. 4 is a cross-section on a larger scale of the packing and of a portion of the end-pieces in the position for which they ensure a fluid-tight closure.

Figure 5:
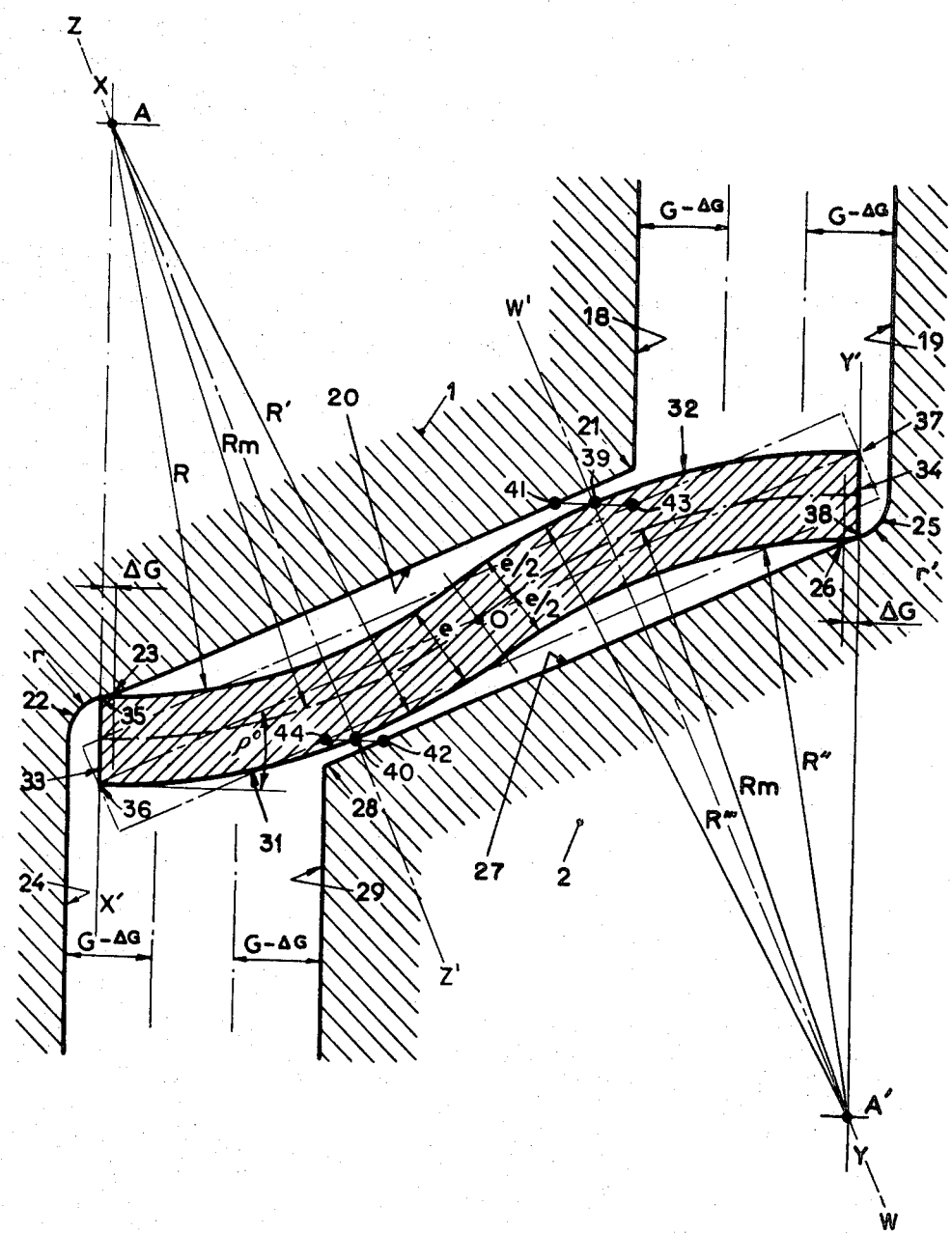
FIG. 5 is a cross-section similar to FIG. 4 of the packing and of a portion of the end-pieces, the latter being partly fitted inside one another, said figure showing the radii of curvature of the packing surfaces.

The end-piece 1 includes an annular radial surface 18 (FIG. 4) merging over a sharp ridge 21 into a frusto-conical surface 20 merging over the sharp ridge 23 followed by the rounded section 22 into a further radial annular surface 24.

Similarly, the end-piece 2 is provided with a radial annular surface 29, merging over a sharp ridge 28 into a frusto-conical surface 27, parallel with the frustoconical surface 20 of the other end-piece 1 and merging again over a sharp ridge 26, followed by a rounded portion 25, into a radial annular surface 19.

The packing of the connection designated as a whole by the reference 30 is essentially rigid and constituted by a material which is softer than forming the end-pieces. The end-pieces and the packing may be constituted by the same metal such as a light alloy, but in such a case the packing is preferably subjected to a thermal annealing treatment.

The ratio between the hardnesses of the metal of the packing and that of the end-pieces is defined according to the application considered.

In the embodiments illustrated in FIG. 1 and in FIGS. 2 and 3, the packing 30 is given an annular shape, the generating lines of which have an outline showing a double incurvation so that it is defined by inner and outer surfaces 31 and 32 and by terminal surfaces 33 and 34.

The packing 30 shows thus a radial cross-section having a double curvature and it may be used with end-pieces provided with frusto-conical annular surfaces parallel with one another. The ridges of the packing defined by the annular meeting lines between its lateral surfaces having a double curvature and its terminal surfaces are designated rspectively by the reference numbers 35, 36, 37, 38.

Referring now to FIG. 5, when the packing lies between the two end-pieces and before any manual or mechanical presure is exerted on the packing, so as to urge the latter into the rounded sections 22 and 25 at its opposite ends, its ridge 35 faces the sharp ridge 23, while its ridge 38 faces the sharp ridge 26.

The terminal surface 33, the sharp ridge 35 and 36 of the packing and the sharp ridge 23 of the end-piece 1 are located in a common radial plane illustrated by the axis XX'.

Similarly, the terminal surface 34 of the packing with its ridges 37 and 38 is located in a common radial plane illustrated by the axis YY', together with the sharp ridge 26 on the end-piece 2.

The securing of this package for all positions of the slight 1 is ensured bya manual or mechanical pressure exerted on the outer terminal surface 34 of the packing.

The result of jtis pressure is a wedging and a slightly extrusion of the ridge 35 of the packing inside the rounded section 22. The maximum engagement of the packing is limited by the contact along an annular line between the outer surface 32 of the packing 30 and the frusto-conical surface 20 of the end-piece 1.

Similarly, it is possible to secure the position of the packing whatever the position of the packing may be by a manual or mechanical pressure exerted on the terminal surface 3 of the packing. The result of said pressure is a wedging and a slight extrusion of the ridge 38 of the packing inside the rounded section 25. The maximum path of engagement of the packing 30 is limited by the contact along a generating line between the inner surface 31 of the packing 30 and the frusto-conical surface 27 of the end-plate 2.

According to whether the packing 30 has been held in position by pressure at either end, it is possible to engage, either the end-piece 2 or the end-piece 1 over the said packing and it is then sufficient to exert a manual or mechanical pressure on the end-piece fitted afterwards on the packing, so as to obtain a rigid interengagement between the two end-pieces 1 and 2 over the packing 30.

This operation leads to a coaxial alignment without any radial clearance between the parts 1 and 2.

The packing 30 and the end-pieces 1-2 are shaped in a manner such that when the connection is tightened, the packing is developed and compressed in a manner such that its slope remains substantially the same as that of the annular frusto-conical surfaces 20 and 27 of the end-pieces and said packing provides three successive effects producing fluid-tightness, which solves thus all the problems of fluid-tightness preventing leaks by ensuring a gradual clamping until a locking is obtained. A first fluid-tight effect is obtained by the simultaneous urging towards each other of the frusto-conical annular surfaces 20 and 27 of the end-pieces 1 and 2. Said movement of the end-pieces towards each other results firstly in an extrusion of the ridges 35 and 38 of the packing in the rounded portions 22 and 25 and secondly in an action of the annular frusto-conical surfaces 20 and 27 on the projecting points 39 and 40 (FIG. 5), which develops longitudinally the medial axis of the cross-section of the packing 30, whereas the movement of the radial surfaces 19 and 24 of the two end-pieces has a tendency to reduce said longitudinal axis. The packing is thus subjected to two associated strains, of which the opposed actions increase the compression exerted on the packing.

These two strains being higher than the elastic limit of elasticity of the packing, the ridges 35 and 38 are upset into the rounded portions 22 and 25 and the case is the same for the outer terminal surfaces 33 and 34 of which the ridges 36 and 37 are upset and extruded over the terminal radial surfaces 24 and 19.

Obviously, the continuity of the compressional stresses is ensured by the permanent contact between the frusto-conical annular surfaces 20 and 27 on the outer and inner surfaces of the packing at the projecting points 39 and 40 during the tightening operation.

As illustrated in FIG. 5 and in order that the packing may be fitted inside the rounded portion 22 or 25 before it is deformed and brought into a fluid-tight position, the flanges of the end-pieces receive a diametrical cross-section in registry with the ridges 23 and 26, which is slightly less than, equal to or larger than that measured on the packing in registry with the sharp ridges 35 and 38 according to the desired fit to be obtained.

In practice, the selected fit for the packing with reference to the end-pieces is similar to standard fits and depends on the metal used for executing the end-pieces and the packing.

There exists a practical value for the slope of the frusto-conical surfaces 20 and 27 and for the angle defined between the axis joining the rides 36 and 37 and the axis of the connection.

In those connections where the slope defined hereinabove and illustrated by the letter $\rho$ in FIG. 5 is under 15°, the flanges of the end-pieces can be disconnected with a considerable difficulty when it is desired to separate the two pipe sections with reference to each other. The release of the packing with reference to the flanges of the end-pieces may be ensured readily when desired in those connections where the angle $\rho$ is equal to about 30°.

In FIG. 5, the average radius of curvature of the inner and outer surface of the packing is expressed by the formula $$Rm = [b^2 + c^2 - 2bc \cos \theta / 2(b \cos \theta - c)]$$

The size relationship between the packing and the frusto-conical surfaces of the end-pieces 1 and 2 is expressed by the following equation:

$$\left(Rm + \frac{e}{2}\right) \sin \theta = Rm - \cos \theta \left(\frac{e \tan \theta - \frac{e}{2 \cos \theta}}{2}\right) \frac{Rm}{Rm + \frac{e}{2}}$$

In the above expressions Rm is the radius in mm. of one arcuate half-breadth whereof the center A is located in the axis XX' forming an extension of the terminal surface 33 of the packing 30, or else is the radius with the center A' b is one-half of the length in mm. of a straight line joining the ridges 37 and 36 of the packing and passing through the inflexion joint O of the medial axis of the packing.

c is equal to one-half of the thickness $e/2$, of the packing expressed in mm. and it is also equal to the radii $r$ and $r'$ expressed in mm. of the rounded portions 22 and 25 of which the centers are located respectively on the axes XX' and YY' (FIG. 5).

$\theta$ is the angle the value of which in degrees is the complement of $\rho$, which means $\theta = 90° - \rho$, the angle $\rho$ being expressed in degrees and extending between the lines joining the ridges 36 and 37 of the packing and a straight line parallel with the axis of the connection.

Since $\theta$ is the complement of $\rho$ which is both the angle formed by surfaces 20, 27 and the line between points 36 and 37 the second equation serves to establish a relationship between parts of the packing as well as a relationship between the packing and surfaces 20, 27.

$e$ expresses in mm. the thickness of the packing.

As illustrated in FIG. 5, the radii of curvature R and R' of the outer and inner surfaces of the packing may be expressed as follows:

$R = Rm - e/2$ and $R' = Rm + e/2$ $e/2$ being equal to the half thickness of the packing expressed in mm., while R and R' are the outer and inner radii of curvature of the left-hand half section of the packing expressed also in mm.

Symmetrically, the radii of curvature R'' and R''' of the inner and outer surfaces of the other half section of said packing having for a center the point A' located on the axis Y-Y' may be expressed as follows:

$R'' = Rm - e/2$ and $R''' = Rm + e/2$

It can also be mentioned that the breadth L of the packing (FIGS. 1 to 3) and its half length $b$ are bound, with the same notations as hereinabove, by the relationship $L = 2 b \cos \rho$.

Turning to FIG. 4, which is a radial cross-section of the packing when tightened for maximum fluid-tightness, the second effect of fluid-tightness is obtained by a shearing and compression of the inner surfaces 31' and 32' of the packing deformed between the annular frusto-conical surfaces 20 and 27 of the end-pieces.

The third fluid-tightness effect is obtained simultaneously with the second effect by a rolling, jumping and engagement of the metal forming the packing by the sharp ridges 21 and 28 and also by the ridges 23 and 26 of the end-pieces. Said engagement is furthered by the increase in the thickness of the packing from the value $e$ to the value $e'$, under the action of the tightening stresses.

The packing thus deformed by the tightening stresses fills the space comprised between the annular frusto-conical surfaces facing each other and forms convex sections 45 and 46 and closes substantially the rounded portions 22 and 25 under the action of the jumping of the terminal surfaces 33 and 34 of the packing.

In other words, when the end-pieces and packing occupy their tightened position (FIG. 4) the length of the compressed packing measured between the points $p$ and $p'$, that is, the length of a line 47 forming the axis of the packing at mid-distance between the surfaces 31' and 32' of said packing and located in a plane passing through the axis of said joint, is shorter than the line 48 joining the ridges 36' and 37' of the packing, when developed freely and subjected to no stresses ascribable to compression and to extrusion.

The sealing thus obtained retains in a perfectly reliable manner fluid-tightness with reference to fluids and to vacuum even if the connection is subjected to violent vibrations during its use or if the packing is subjected to flexional stresses.

It is, however, of interest that, in the connection forming the object of the invention, and which is executed for use in pipe sections which require a dismantling of their different parts, the mutual joggling of the packing and of the end-pieces may be such that it does not prevent such a dismantling.

When dismantling, the packing is released easily from its bearing surfaces in contradistinction with prior connections wherein the residual deformation of the packing upon dismantling may lead to difficulty in removing the packing out of its bearing surface and in separating the end-pieces.

As a matter of fact, when dismantling the connection, the residual elasticity of the packing has a tendency to increase its length and consequently to space the end-pieces apart. At the same time the packing has a tendency to resume its double curvature which, although slight, releases the convex extrusions 45 and 46 with reference to the ridges 28 and 21, which allows moving the end-pieces apart. The annular rabbets formed by the rounded sections 22 and 25 do not engage the corresponding surfaces when the connection is being tightened so that the tightening stress acts solely on the actual packing 30.

To this end, the various elements receive a size such that the radial terminal cooperating surfaces 18, 19 and 24, 29 of the end-pieces remain apart when the annular frusto-conical surfaces are in contact with the lateral compressed surfaces $-'$ and 32' of the developed packing.

In FIG. 5, the stress for tightening the end-piece 1 is applied to the point 39 of the outer surface 32 of the packing 30. The point 39 is located on a straight line W, W' perpendicular to the straight line connecting the ridges 36 and 37 of the packing and passing through the center A' of the radii of curvature Rm, R'' and R''', said point 39 lying at a distance from A' which is equal to the radius of curvature having a value R'''.

Similarly, the tightening stress exerted on the end-piece 2 is applied at a point 40 of the surface 31 of the packing 30. Said point 40 is located on a straight line ZZ' perpendicular to the straight line joining the ridges 36 and 37 of the packing and passing through the center of the radii of curvature Rm, R and R' at a distance from said center A equal to the radius of curvature having a value R'.

The half distance required for the development and tightening of the packing through action of the annular frusto-conical surface 20 on the projecting point 39 of the packing is defined by a section of a straight line parallel with the axis of the connection extending between said point 39 and the point 43 located on the surface 32' of the developed packing.

Similarly, the half distance required for the development and tightening by the action of the frusto-conical surface 27 at the point 40 of the packing is defined by a section of a straight line parallel with the connection axis and extending between said point 40 and the point 44 located on the surface 31' of the developed packing.

It should also be mentioned that furthermore and in accordance with the invention:

The point O forms the center of symmetry of the cross-section of the packing 30. The half length of the section of the axis extending between the point 36 or 37 and the center of symmetry 0 and of which the value is $b$ expressed in mm. should be equal to the thickness $e$ of the packing 30 expressed in mm. and multiplied by a coefficient ranging between 3 and 6, said coefficient being applicable to all the values of the angle $\rho$ expressed in degrees and ranging between 15 and 45°, the angle $\rho$ being the half-apical angle defining the common slope, with reference to the axis of the connection, of the annular frusto-conical surfaces 20 and 27.

The terminal surfaces 33 and 34 of the packing 30 may be chamfered or slope by an angle $\alpha$ ranging between 0 and 30°, towards the outside of the packing, the apex of said angle $\alpha$ being located respectively at points 35 and 38 (FIG. 2).

The terminal surfaces 33 and 34 of the packing may also be chamfered or slope by an angle $\alpha$ ranging between 0 and 30° towards the inside of the packing, the apex of said angle being located respectively at points 35 and 38 (FIG. 3).

The radii $r$ and $r'$ expressed in mm. of the rounded sections 22 and 25 are preferably equal to one-half the thickness $e/2$ of the packing expressed in mm.

The axis joining the ridges 36 and 37 of the packing when not developed, coincides with the axis 47 of the packing in its developed condition.

The embodiments described hereinabove and illustrated in the drawings are given solely by way of example and in a non-binding sense and obviously also, it is possible to modify the shape, arrangement and assembly of the different parts. Thus, instead of being limited by surfaces with a gradually varying curvature, the packing may be provided with a broken-lined outline; the packing and the end-pieces may also be of plastic.

That which is claimed is:

1. A sealing ring for interposition between pipe sections with complementally formed portions comprising an annular body permanently deformed under pressure of said pipe sections said body before deformation by said pipe sections, having inner and outer surfaces and terminal surfaces at its ends, said terminal surfaces meeting the inner and outer surfaces at end edges, said body being of uniform thickness throughout its length, each of said inner and outer surfaces being continuously reversely curved from one end edge to another to form a convex surface and a concave surface joined at a point of inflection, the diameter of one end of said annular body being smaller than the diameter at the other end of said annular body, and the inner and outer surfaces being directed substantially parallel to the longitudinal axis of the annular body at each end edge, the average radius of curvature, in mm., Rm, of the inner and outer surfaces being expressed by the formula:

$Rm = [b^2 + c^2 - 2bc \cos \theta / 2(b \cos \theta - c)] b$ being the half length in mm. of a line extending between the edge of the sealing ring furthest from the longitudinal axis of the annular body and the diagonally opposed edge nearest to the said axis, $c$ being the half thickness in mm. of the seal and $\theta$ being the difference between 90° and the angle measured in degrees between said diagonal line and the said axis of the sealing ring.

2. A sealing ring as claimed in claim 1, the size relationship between Rm, $\theta$ and the thickness $e$ of the annular body being defined by:

$$\left(Rm + \frac{e}{2}\right) \sin \theta = Rm - \cos \theta \left(\frac{e \tan \theta - \frac{e}{2 \cos \theta}}{2}\right) \frac{Rm}{Rm + \frac{e}{2}}$$

3. A sealing ring as claimed in claim 1, wherein the diagonally opposed edges are extrudable, in said first direction.

4. A sealing ring as claimed in claim 1, wherein the terminal surfaces are chamfered.

* * * * *